United States Patent [19]

Halishak

[11] 4,247,395
[45] Jan. 27, 1981

[54] SEWAGE TREATMENT PROCESS AND APPARATUS

[76] Inventor: William V. Halishak, 3520 Lenwood Rd., Broadview Heights, Ohio 44147

[21] Appl. No.: 33,814

[22] Filed: Apr. 27, 1979

[51] Int. Cl.³ .......................................... B01D 37/04
[52] U.S. Cl. ................................ 210/73 S; 210/780; 210/806
[58] Field of Search ...................... 210/77, 73 R, 73 S, 210/67, 387, 324, 329, 335, 400, 401, 97, 104

[56] References Cited

U.S. PATENT DOCUMENTS

| | | | |
|---|---|---|---|
| 1,160,918 | 11/1915 | Linden | 210/73 R |
| 2,665,812 | 1/1954 | Crane | 210/387 |
| 3,489,679 | 1/1970 | Davidson et al. | 210/387 |
| 3,915,859 | 10/1975 | Sundin et al. | 210/324 |
| 4,137,062 | 1/1979 | Mullerheim et al. | 210/387 |

OTHER PUBLICATIONS

"Deep Bed Filtration"; Industrial Filters Co., 9 Industrial Rd., Fairfield, N.J.; (Bulletin); date ukn.

Primary Examiner—Frank Sever

[57] ABSTRACT

A tertiary sewage treatment process separates organic wastes from the liquid content of sewage. The process includes the steps of directing sewage onto a first disposable sheetlike filter from a system which periodically bulks. Solids of above a predetermined size are collected on the first disposable sheetlike filter. Solids of less than the predetermined size flow through the first disposable sheetlike filter. The level of the sewage pool on the first disposable sheetlike filter is sensed. The first disposable sheetlike filter is indexed when the pool level is above a predetermined amount to present a new portion of the first disposable sheetlike filter to the sewage pool and to move the used portion of the first disposable sheetlike filter to a storage area. The disposable sheetlike filter with the sewage layer thereon is periodically moved from the storage area. The material which is directed from the first disposable sheetlike filter is directed to a second disposable sheetlike filter, and all of the afore-mentioned steps are repeated with regard to the second disposable sheetlike filter. Substantially pure water is withdrawn from the second disposable sheetlike filter.

5 Claims, 6 Drawing Figures

SEWAGE TREATMENT PROCESS AND APPARATUS

BACKGROUND AND SUMMARY OF THE PRESENT INVENTION

The present invention relates to a sewage treatment process and apparatus, and particularly to a process and apparatus for filtering sewage so as to remove organic solids therefrom and provide a substantially pure effluent emanating therefrom in accordance with desired standards.

A common way of filtering sewage is through the use of a so-called and relatively expensive rapid-sand filter. Rapid-sand filters require a substantial amount of land area. They also must be backwashed in order to clean the sand filter material. Further, the backwash water must be treated and handled.

In addition, the rapid-sand filter during heavy solids loading quickly requires backwashing. As a result, during heavy solids loading a rapid-sand filter backwashes for a substantial time period and little filtering actually occurs. Further, rapid-sand filters in the event of a power failure are totally inoperative since the pumps and motors thereof cannot be operated.

Notwithstanding the problems with rapid-sand filters, the rapid-sand filter today is the best known and most used method for filtering sewage so as to provide the desired purification of the effluent emanating therefrom. The rapid-sand filters meet government standards on the degree of solids which are permitted in the effluent emanating from the filter only under ideal operating conditions.

The present invention is directed to a substitute for the rapid-sand filter, and particularly a substitute which does not involve the large land area required by a rapid-sand filter, and does not require backwashing. Thus, the present invention obviously avoids the necessity of treatment of backwash water. Also, the present invention is effective and continuously operates to provide desired effluent during heavy solids loading. Moreover, the present invention is substantially less expensive than the rapid-sand filter and operates even if there is a power failure. Further, not only does the present invention avoid the problems with the rapid-sand filter, but also the method and apparatus of the present invention is a practical and economical way of filtering sewage.

In accordance with the present invention, the sewage is subjected to two filtering treatments, with the filter element in both treatments being a disposable sheetlike filter. The first filtering is a standardizing filter stage. The second is a polishing filter stage. The function of the first treatment is to standardize the particle size delivered to the polishing stage. The polishing stage filters the finer solids and the effluent of the desired quality flows therefrom. In the event of a heavy solids loading, the two-stage filtering is effective to provide a purified effluent without the need for backwashing.

In both filter stages the sewage is deposited on a disposable filter sheet and as the fluid flows through the filter sheet, solid particles are retained on the filter sheet. As the pores of the filter sheet fill up and clog, the sewage forms a pool on the filter sheet. When the pool rises to a predetermined level, a switch is tripped which actuates a filter indexing operation. Specifically, the filter sheet is indexed to expose a clean filter sheet area to the sewage which is the pool.

A portion of the filter sheet is moved out of the pool of sewage during indexing. After a time period, the filter sheet, due to the various indexing operations, is moved through a drying zone. This drying zone is in part defined by a discharge ramp which extends upwardly at an angle to the pool of sewage, (in the order of 25 degrees to the horizontal) and further includes a vertical drop from the end of that discharge ramp. This drying zone is made large enough so as to enable the filter sheet and intercepted solids to be completely dried prior to the need for the filter sheet to be handled for removal from the equipment. The complete drying of the sewage on the filter sheet enables the used filter sheet with the sewage dried thereon to be readily handled. Further, the handling thereof is not obnoxious to workers.

As noted above, the use of the two-filter process of the present invention, i.e., standardizing and then polishing, is necessary in order to obtain a continuous flow of effluent with the desired parts of solids therein from the filtering system under extremely high solids loading. Further, with the present invention, no backwashing is necessary, costs are lower, use area is smaller, and standby power may be available. The present invention is a substantial improvement over the rapid-sand filter.

DESCRIPTION OF THE DRAWINGS

Further objects and features of the present invention will be apparent to those skilled in the art to which it relates from the following detailed description of a preferred embodiment of the present invention made with reference to the accompanying drawings in which:

FIG. 6 is a schematic perspective view illustrating the operation of the mechanism of FIG. 5.

DESCRIPTION OF THE PREFERRED EMBODIMENT

As noted hereinabove, the present invention relates to the treatment of sewage, and in particular to a process which eliminates the need for a rapid-sand filter in a sewage treatment process. Specifically, the present invention provides an apparatus which is a total substitute for a rapid-sand filter in a sewage treatment system. The present invention may take a variety of different forms and constructions and is shown in FIG. 1 in a representative way as applied to a sewage treatment system which is generally designated A.

Figure 1:
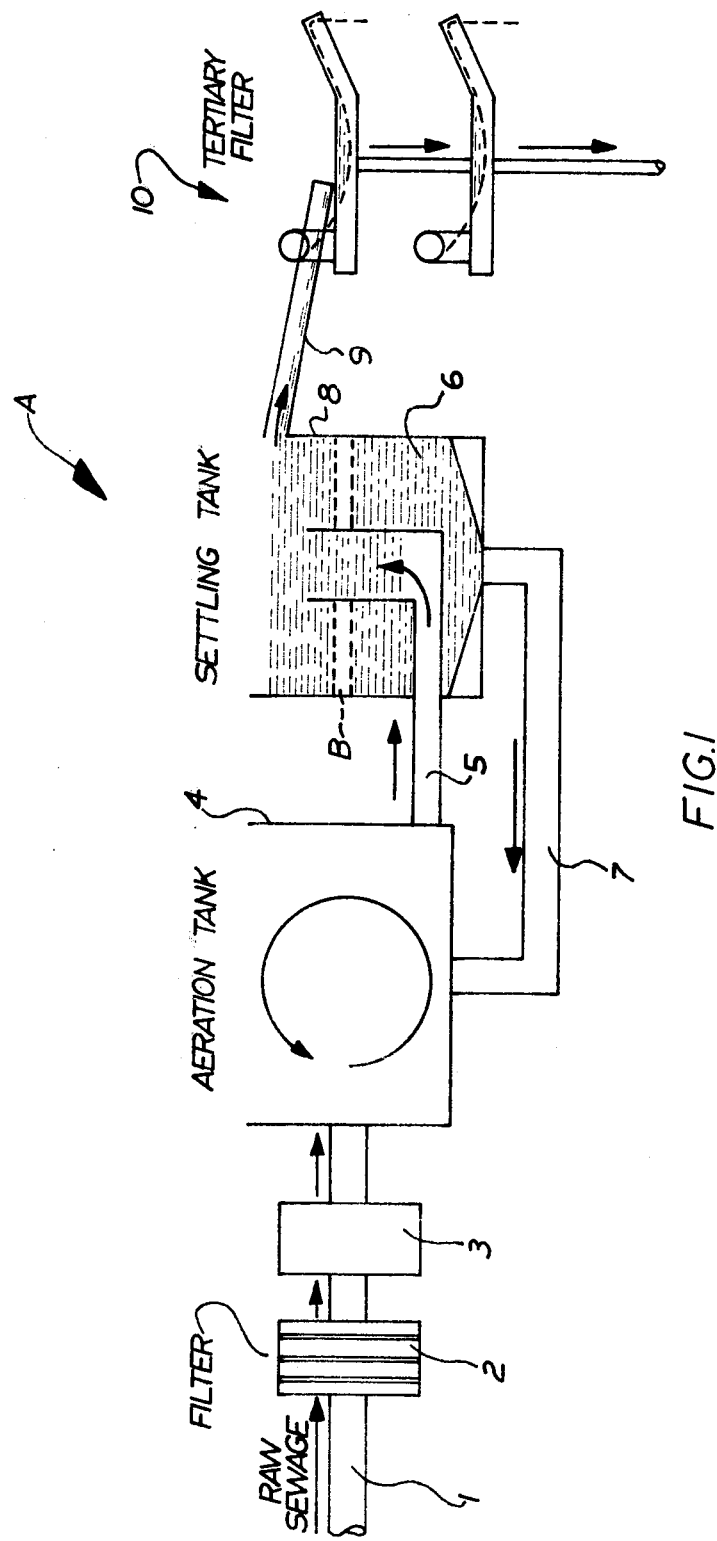
FIG. 1 is a schematic view of a sewage treatment system embodying the present invention.

The sewage treatment system A illustrated in FIG. 1 receives raw sewage and provides an output of effluent purified to a desired standard. The raw sewage is received in the system through an input conduit 1. In the system the sewage first flows into a bar screen 2. The bar screen 2 is a series of bars which filter out any large solids which may be in the sewage such as logs, etc. From the bar screen 2 the sewage flows into a comminutor 3 in which the sewage is ground up. The sewage then flows into aeration tanks such as tank 4 in which the sewage is agitated and aerated. The sewage flows from the aeration tank 4 through an outlet conduit 5 into a settling tank 6. The sewage settles in the settling tank and heavy solids, settle to the bottom of the settling tank. Those materials, commonly referred to as sludge, are removed from the settling tank through a conduit 7 and flow back into the aeration tank 4.

Any particles which are lighter than water or have substantially the same specific gravity as water will float to the top of the settling tank 6. The materials which are adjacent to the top of the tank flow over a weir which is schematically shown at 8 and flow through an outlet conduit 9 to a tertiary filter system, generally designated 10. The material, of course, that flows over the weir 8 and through the conduit 9 to the tertiary filter system 10 has solid particles therein which are either lighter than water or have substantially the same specific gravity as water.

The present invention is directed to an improved tertiary filter 10. In the prior art, the tertiary filter is commonly a rapid-sand filter. The problems of the rapid sand filter are substantial as set forth in the introductory portion of this application. The problems with a rapid-sand filter are particularly acute during heavy solids loading of the rapid-sand filter. Such heavy solid loading occurs when the settling tank 6 bulks. Bulking of the settling tank 6 results in heavy solids flowing over the weir 8 and into the tertiary filter system 10.

Bulking can occur for a variety of different reasons. It is common knowledge that solids in the settling tank can form a layer such as illustrated at B in FIG. 1. The layer B can block the settling of solids and also can be such that it will rise in the settling tank and force heavy solids over the weir 8 and, in fact, itself be forced over the weir 8 to cause a heavy solid loading of the tertiary filter 10.

When a rapid-sand filter encounters a bulking condition, the rapid-sand filter is incapable of effectively handling the bulking. The rapid sand filter must be continuously backwashed during bulking, and accordingly the rapid-sand filter is very ineffective in handling a bulking condition. Further, the rapid-sand filter which has been used as a tertiary filter has all of the difficulties which were discussed above in the introductory part of this application.

In accordance with the present invention, the tertiary filter system 10 includes a pair of filtering stations 11, 12. The construction of the apparatus at each filtering station 11, 12 is substantially identical, and the apparatus at only one station will be described hereinbelow. Each of the filtering stations 11, 12 utilize a filter 11a, 12a, respectively, which is in sheet form. The sewage is deposited on the sheet filter in station 11 from the conduit 9. Only relatively small particles will flow through the filter at station 11 along with liquid. The mixture that flows through the sheet filter 11a will be deposited on the filter 12a at filter station 12. At station 12, still further small particles are removed from the effluent and water flows from the filter station 12, purified to the desired degree.

The filter station 11 is a standardizing filtering operation which functions to standardize the size of particles which are flowed from the filter station 11 to the second filter station 12. The second filter station 12 is a polishing filter station at which extremely small particles are removed from the effluent and relatively clean water flows from the filter station 12 to the output. During bulking of the sewage system and extremely heavy loading of the tertiary filter system, the first filter station 11 will be effective to remove a substantial amount of the solids. However, it should be realized that the second filter station 12 will also be effective in removing any excess solids that are flowed thereto. The two filters together provide for effective filtering and maintain the effluent exiting from the filter station 12 in accordance with a desired standard in a continuous manner. This continuous exiting of purified effluent will occur even during bulking of the sewage system. Thus, during bulking, the filters 11, 12 will continue to operate without all of the problems relating to backwashing as are necessary with the rapid-sand filter.

Figure 4:
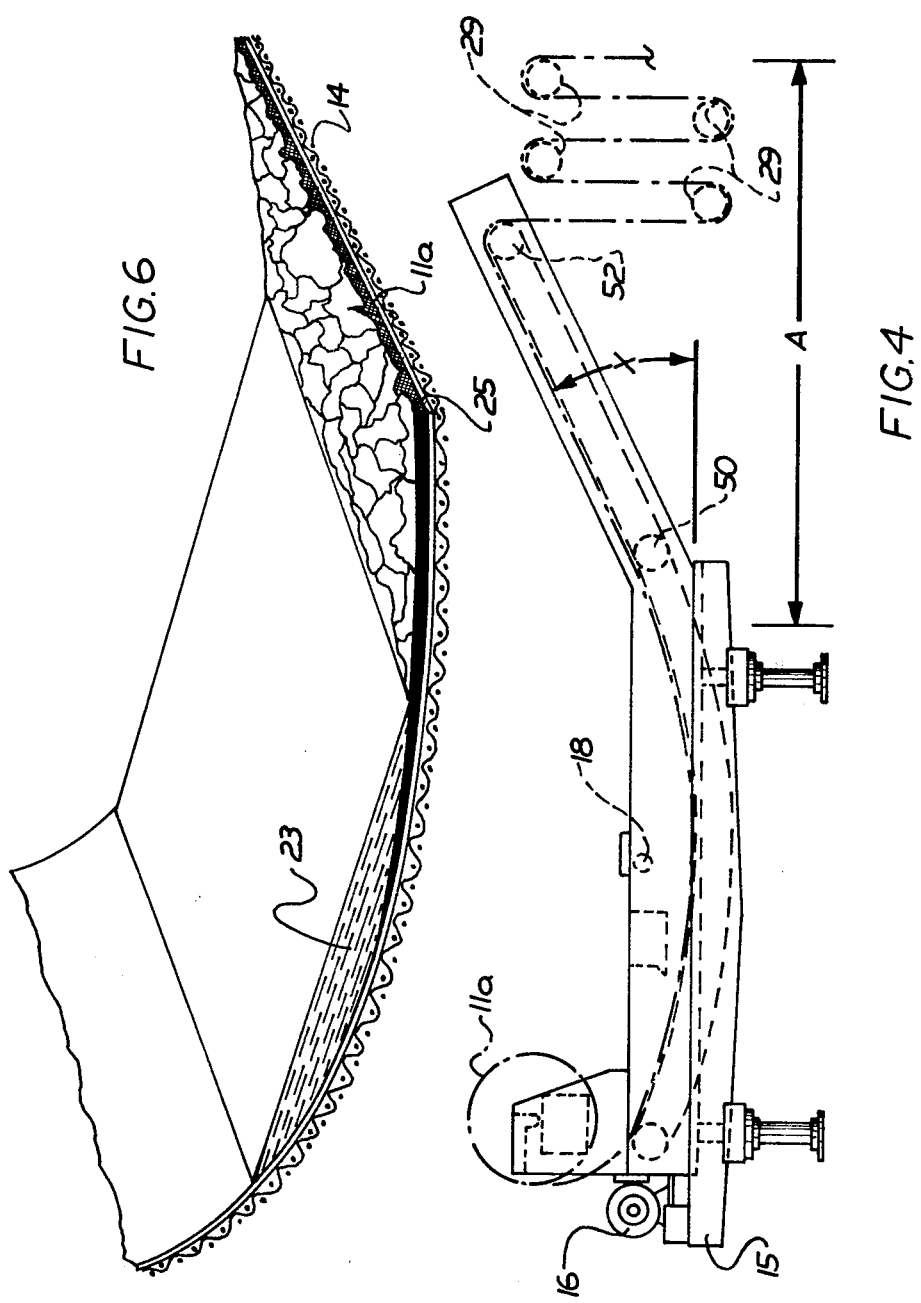
FIG. 4 is a side elevational view of a portion of the mechanism shown in FIG. 2.
Figure 5:
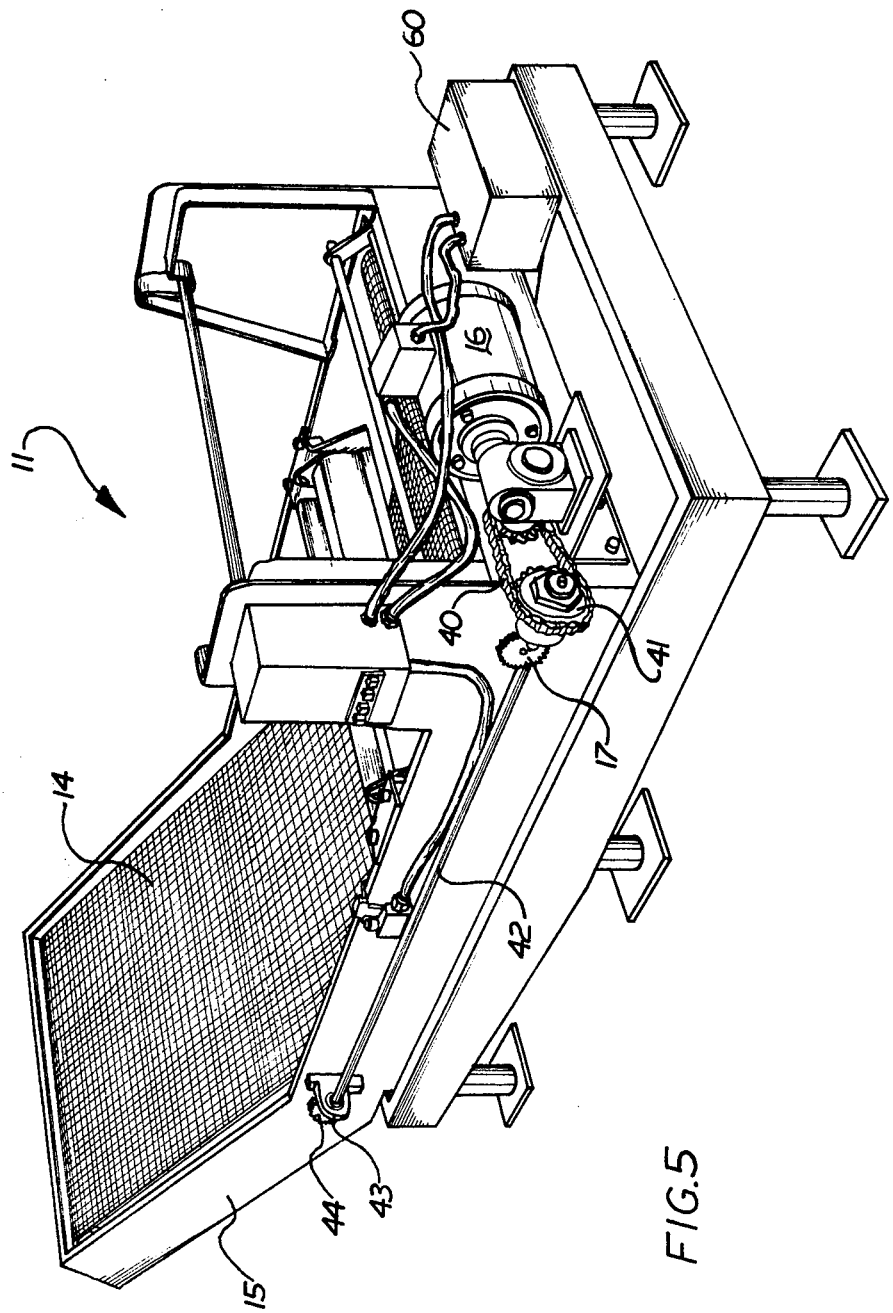
FIG. 5 is a schematic perspective view illustrating a portion of the sewage treatment system shown in FIG. 4.

As best shown in FIG. 4, the sheet filter 11a, 12a which is used at stations 11 and 12 is supplied in a roll 13. Specifically, each filter comprises a web of sheet material. The filter is pulled from the supply roll 13 and lies on a screen conveyor 14. The screen conveyor 14 and roll 13 are supported in a frame 15. The frame 15 also supports a motor 16 and a drive, generally designated 17, for driving the screen conveyor 14. The motor 16 is energized through an electrical circuitry which includes a float switch 18.

Figure 3:
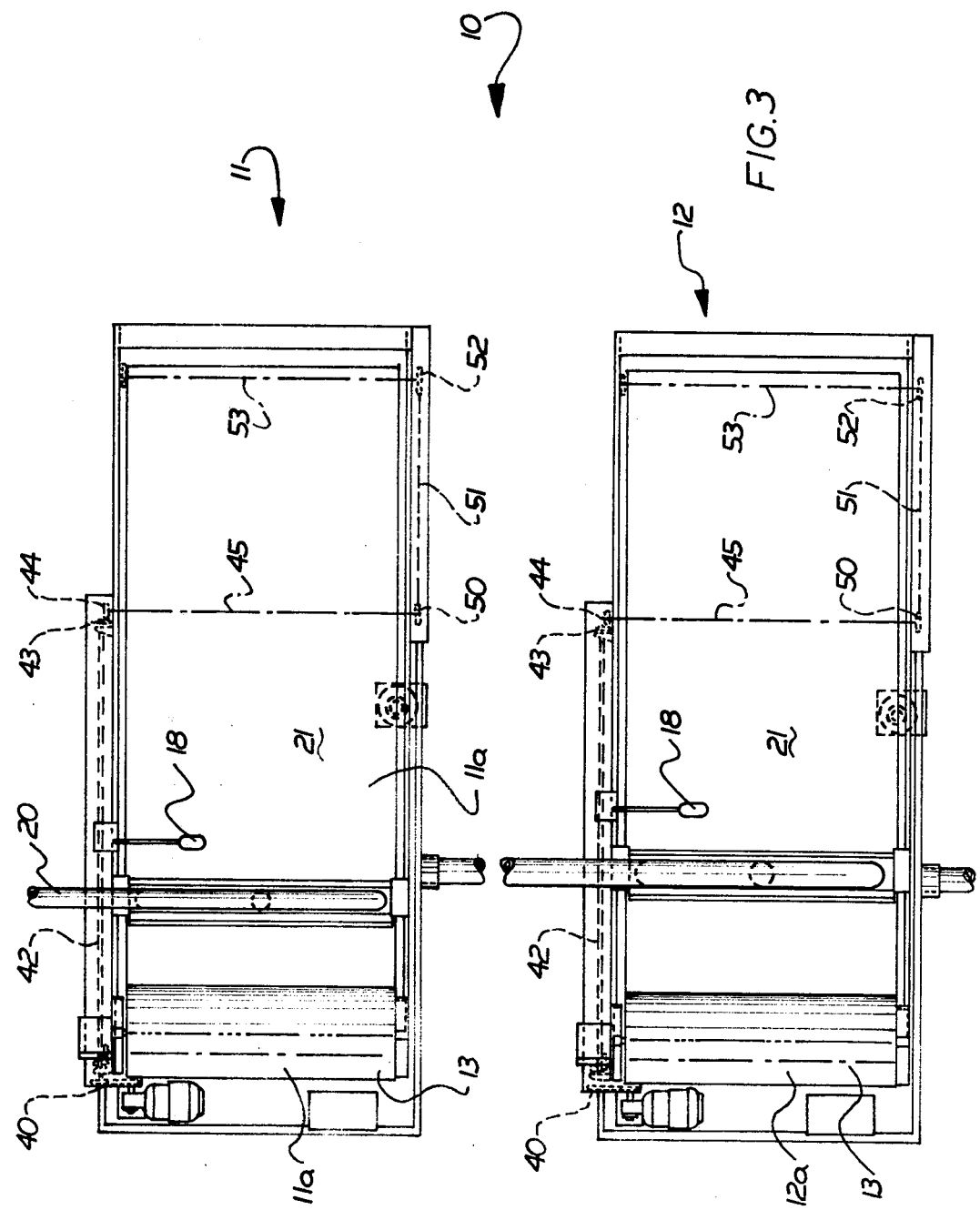
FIG. 3 is a top plan view of the mechanism disclosed in FIG. 2.

The conveyor 14, as best shown in FIG. 3, extends from beneath the supply roll 13 downwardly. The conveyor 14 extends at the right end of the frame 13, as shown in FIG. 3, upwardly and to a level which is located above the axis of rotation of the roll 13. The conveyor is somewhat concave, as illustrated in FIG. 3, in that it takes a somewhat curved path.

The frame 15 and the conveyor 14 define an area into which is deposited sewage through a suitable conduit 20. The sewage specifically is deposited in an area designated 21 on the filter. The effluent or liquids flow through the filter and the solids are retained on the filter. As the pores of the filter become filled or blocked, the sewage, of course, builds up on the filter and forms a pool of sewage 23 (see FIG. 6). Eventually, a float switch 18 is actuated when the level of the pool sewage on the filter reaches a predetermined level. When the switch 18 is actuated, the motor 16 is operated.

The motor 16, when it is operated, drives the belt 14 and the belt will pull the clean filter down into the sewage pool or filter zone where the filtering action is occurring. As a result, more effluent may flow through the conveyor, and the area of the filter, which is clogged or relatively clogged with sewage will exit from the filter zone or area of the sewage pool.

As best shown in FIG. 6, the sewage pool is designated 23 and the sewage exiting therefrom is shown as forming a layer on the filter and is designated 25. As the sewage exits from the pool, the sewage and filter enter a drying zone. The drying zone is designated A in FIG. 4. This zone extends upwardly along the entire extent of the conveyor 14, and then downwardly from the upper height of the conveyor. Specifically, the conveyor 14 in this area extends upwardly at an angle (see FIG. 4) of approximately 25° to the horizontal.

After drying, the filter with the sewage layer thereon is deposited in a container (not shown), or is trained around a series of rollers 29 and wound up into a roll. The drying zone is of such a length that the sewage layer which has been deposited on the filter is dried by the time that it reaches the container for receiving the filter with the sewage layer thereon or prior to the time it is rolled up. As a result of the fact that the sewage is dried on the filter, it is not objectionable to operators to emove and handle the filter with the sewage layer hereon.

Figure 2:
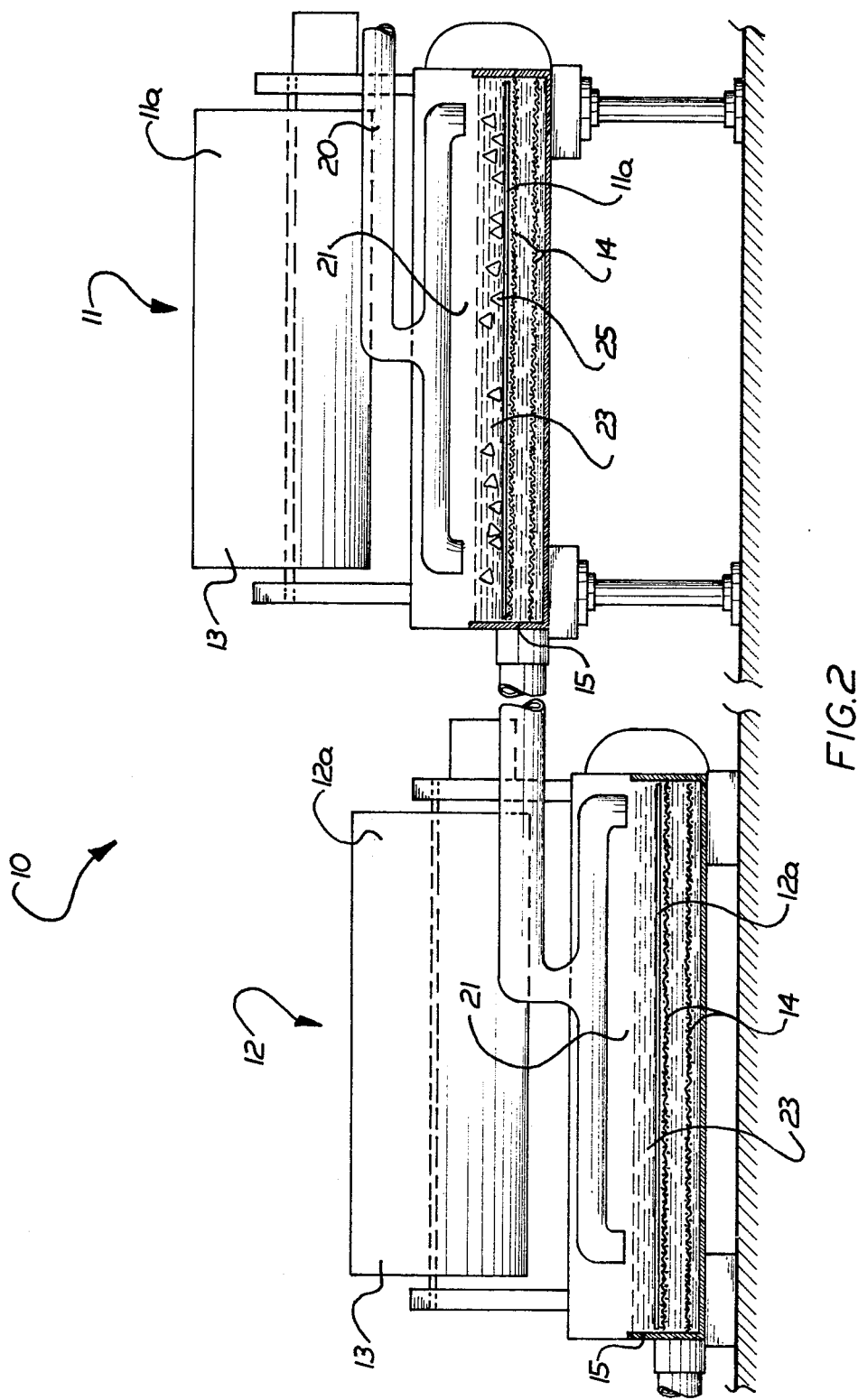
FIG. 2 is a schematic end view of a portion of the sewage treatment system of FIG. 1.

As noted hereinabove, when the pool of sewage on he filter sheet reaches a predetermined level, the motor 16 is energized to effect indexing of the filter sheet hrough a drive, generally designated 17. The drive 17 ncludes a chain 40 which drives a sprocket 41. The procket 41 is carried on and drives a shaft 42. The shaft 42, as schematically shown in FIG. 2, has a bevel gear 43 on the end thereof which meshes with the bevel gear 44 on a shaft 45 which extends transverse to the direction of movement of the screen conveyor 14. The shaft 45 has on its end a sprocket 50. A chain 51 extends around the sprocket 50 and is driven upon driving the procket 50. The chain 51 drives a sprocket 52 which is ocated at the outermost end of the screen conveyor 14. The sprocket 52 is mounted on a shaft, designated 53, which effects driving of the screen conveyor 14.

It should be apparent that the shaft 42 extends perpendicular to the axis of rotation of the supply roll 13. It should be further apparent that the shaft 53, which extends transverse to the screen conveyor 14, is located at a level above the pool of sewage contained on the filter sheet. It should also be apparent that the drive chain 51 extends along a portion of the frame 15 which projects upwardly away from the pool of sewage on the filter sheet.

Further in accordance with the present invention, each of the filter stages 11 and 12 are provided with standby power. In particular, each are provided with a battery pack designated 60 in FIG. 4. The battery pack 60 provides standby power for the motor 16. As a result, in the event of power failure, the battery pack can be automatically, by tripping of a manual switch (not shown), put into the system in order to provide power for operating the motor 16. As a result, the tertiary filter 10 of the present invention, even in the event of a power failure, is still operative and the sewage treatment system will continue to operate in the event of a power failure. This should be contrasted against rapid-sand filters where standby power is not available to operate the various pumps and motors of the rapid-sand filter system in the event of a power failure.

As noted hereinabove, the effluent, as it exits from the filter station 11, flows to the second filter station 12. The second filter station 12 utilizes a filter sheet 12a which is finer than the filter sheet used in the station 11. The filter sheet 12a at station 12 has the effluent from station 11 deposited thereon in a location where again a pool of sewage is provided on top of the filter sheet 12a. Again, as the filter clogs, the float switch 18 will be actuated to actuate the motor 16. The motor 16 will trigger the movement of the filter sheet so as to present a clean filter sheet area to the pool of sewage which is located thereon. This filter station also has a drying zone A where the filter sheet and intercepted solids, as they move through the drying zone, will dry.

The filter sheet which is used at the first station 11 is preferably 40–150 micron biodegradable rayon fabric. A biodegradable fabric is a fabric which will decompose through a natural aging process when buried underground. The filter sheet used at the second station 12 is preferably 25-micron biodegradable rayon fabric. These fabrics are supplied by Stearns & Foster.

As discussed hereinabove, the present invention does provide a practical and efficient way of purifying sewage and, particularly, a way in which sewage may be purified in a reliable manner utilizing two filtering steps, each of which utilizes a filter sheet. Further, the drying zone, which is large enough so as to enable the sewage and the filter to dry prior to being handled, makes the system practical. The present invention is a viable substitute for the rapid-sand filter in sewage treatment systems and a substantial improvement thereover.

Applicant recognizes that fabric filters in the form of webs have been utilized in a variety of different filtering applications. However, to applicant's knowledge, no one has ever suggested the use of equipment such as disclosed herein in a sewage filtering process, instead of the commonly used rapid-sand filter. The use of this equipment in sewage treatment systems as a substitute for the rapid-sand filter has substantial advantages, all as set forth above.

Having described my invention, I claim:

1. In a sewage treatment process in which organic waste is separated from the liquid content of sewage, the improvement consisting essentially of,
   (a) providing a sewage treatment apparatus in which organic waste is separated from the liquid content of sewage, said apparatus comprising means for directing the sewage onto a first disposable sheetlike filter from a system which periodically bulks, said first disposable sheetlike filter collecting solids above a predetermined size thereon, solids of less than the predetermined size remaining in the liquid flowing through said first disposable sheetlike filter, means for sensing the level of the sewage pool on the first disposable sheetlike filter, means for indexing the first disposable sheetlike filter when a predetermined pool level has been achieved to present a new area of the first disposable sheetlike filter to said pool and for moving the first disposable sheetlike filter with the sewage layer thereon to a first storage area, means for directing the solids of less than said predetermined size and the liquid which flowed through said first disposable sheetlike filter onto at least a second disposable sheetlike filter, means for sensing the level of the sewage pool on said second disposable sheetlike filter, means for indexing said second disposable sheetlike filter when a predetermined pool level has been achieved thereon and for moving said second disposable sheetlike filter with the sewage layer thereon to a second storage area, and means for directing the substantially pure fluid from said second disposable sheetlike filter,
   (b) feeding sewage effluent from a secondary step of said process to said apparatus,
   (c) withdrawing substantially pure water from said apparatus.

2. A sewage treatment process as defined in claim 1 wherein said sewage is directed onto said first disposable sheetlike filter from a settling tank.

3. A sewage treatment process as defined in claim 1 further including the steps of moving each of the disposable sheetlike filters through a drying zone prior to said storage area by moving said disposable sheetlike filters in a direction upwardly and away from said respective sewage pools to a predetermined level and then moving said disposable sheetlike filters vertically downwardly from said predetermined level to said storage areas.

4. A sewage treatment process as defined in claim 3 further comprising the steps of providing a screen conveyor for supporting each of said disposable sheetlike filters and effecting indexing of said respective disposable sheetlike filters by driving said respective screen conveyors.

5. A sewage treatment process as defined in claim 4 wherein each of said screen conveyors is driven by applying a driving force to said screen conveyor at said predetermined level to which said filter is moved upwardly from said pool.

* * * * *